July 24, 1923.
C. J. JOHNSON
1,462,811
EMERGENCY DRUM FOR AUTOMOBILES
Filed April 18, 1922
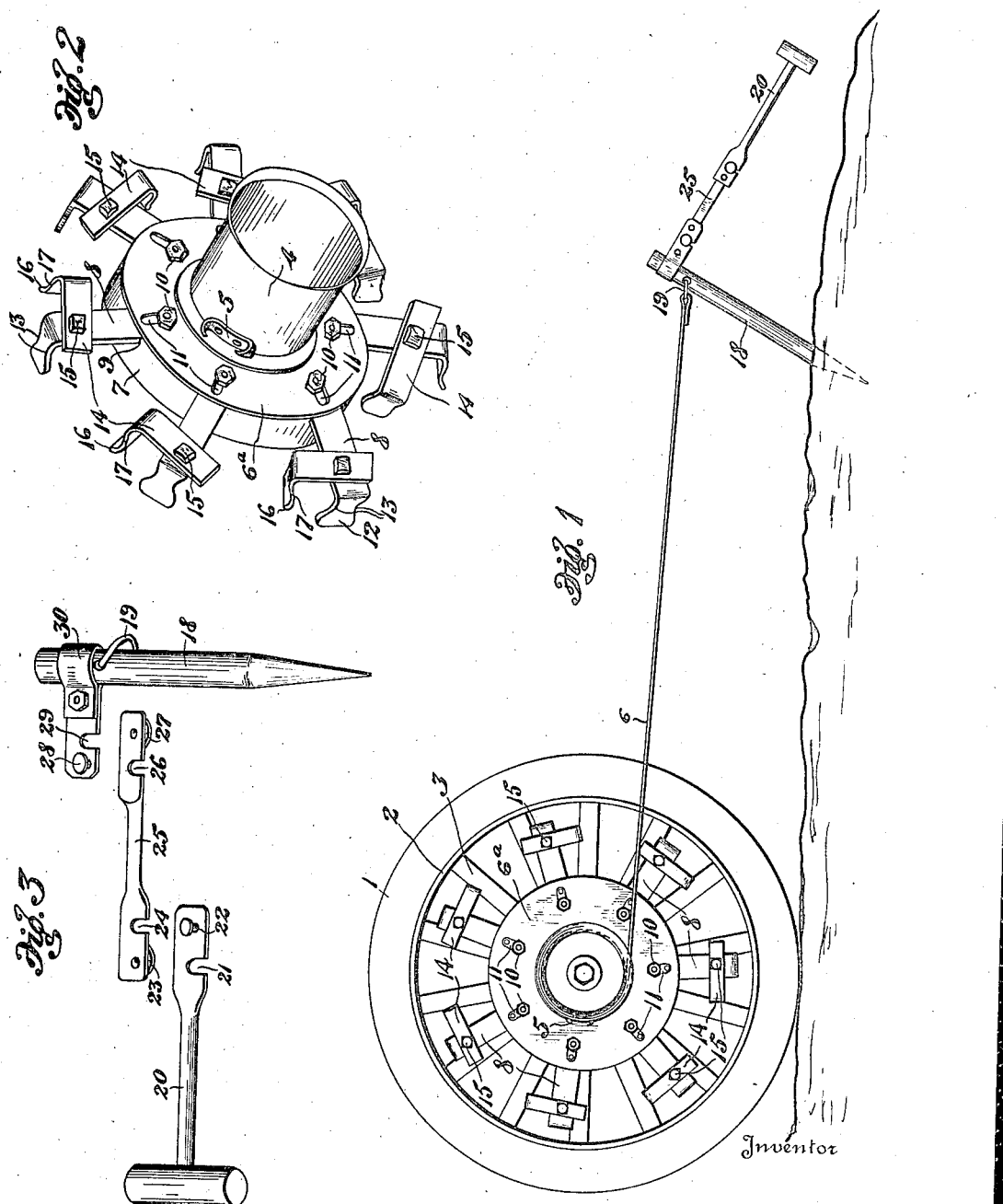
Inventor
Charles J. Johnson
By Frease and Bond
Attorneys Patented July 24, 1923.

1,462,811

UNITED STATES PATENT OFFICE.

CHARLES J. JOHNSON, OF CANTON, OHIO.

EMERGENCY DRUM FOR AUTOMOBILES.

Application filed April 13, 1922. Serial No. 555,163.

*To all whom it may concern:*

Be it known that I, CHARLES J. JOHNSON, a subject of the King of Sweden, residing at Canton, in the county of Stark and State of Ohio, have invented a new and useful Emergency Drum for Automobiles, of which the following is a specification.

This invention relates to improvements in a detachable emergency drum arranged to be attached to the driving wheel of an automobile and provided with a cable for withdrawing the automobile from a mud hole, ditch or similar place.

The objects of the invention are to provide a detachable cable drum which may be quickly and readily fixed upon a spoked wheel, an anchor being provided for attaching the end of the cable, the anchor being designed to prevent the same from being uprooted by the pull of the drum.

The above and other objects may be attained by providing a drum designed to fit over the hub of an automobile wheel and having raised arms provided with pivoted clamping levers by means of which the drum may be fixedly clamped upon the spokes of the wheel, and by providing a cable anchor having a lever attachment to counterbalance the pull of the drum.

A preferred embodiment of the invention is illustrated in the accompanying drawings, in which—

Figure 1 is a side elevation of an automobile driving wheel showing the improved drum attached thereto, illustrating the cable of the drum connected to the improved anchor.

Fig. 2, a perspective view of the drum; and

Fig. 3, a perspective view of the attached parts of the anchor.

Similar numerals indicate similar parts throughout the drawing.

The driving wheel of an automobile is shown generally at 1 and includes the usual rim 2, spokes 3 and hub (not shown), the drum 4 being located over the hub.

The drum is provided with a double ended hook 5 by means of which the cable 6 may be connected to the drum in position to be wound in either direction. The circular plate 6ª is connected to the inner end of the drum and provided around its periphery with the inturned annular flange 7.

The radial arms 8 extend through suitable openings 9 in the flange 7 and are adjustably connected to the plate 6ª by means of the bolts 10 extending through the radial slots 11 in the plate by means of which the radial arms may be lengthened or shortened to accommodate wheels of different sizes.

The extremities of the radial arms 8 are bent inwardly at right angles as shown at 12 and are provided on each side with the rounded notch 13 designed to receive the adjacent side of the adjacent spoke of the wheel.

A pivoted clamping finger 14 is pivoted upon each of the radial arms 8 near the outer extremity thereof as by the bolt 15 and is provided at one end with the inturned portion 16 concaved as at 17 to conform to the contour of the adjacent spoke of the wheel.

The anchor includes the stake 18 having an eye 19 to which the extremity of the cable 6 is connected. A sledge 20 is provided for driving the stake and is provided at its handle end with the notch 21, a head stud 22 arranged to engage the stud 23 and notch 24 respectively in the link 25, said link having at its opposite end a notch 26 and stud 27 for engagement with the stud 28, a notch 29 formed upon the sleeve 30 fixed to the upper end of the stake.

After the stake is driven into the ground at the desired point ahead of the vehicle, the link 25 and sledge 20 are attached to the forward side of the stake as shown in Fig. 1, providing a leverage to counterbalance the pull of the drum.

The drum is placed upon the driving wheel as shown in Fig. 1, each of the clamping fingers 14 being forced down and forward engaging the adjacent forward spoke and forcing the opposite side of the inturned portion 12 of the adjacent radial arm into tight engagement with the adjacent rear spoke.

The drum is thus held rigidly upon the wheel and when the cable 6 is attached to the hook 5 of the drum and the wheel rotated in the direction of the arrow in Fig. 1, the cable will be wound upon the drum, pulling the vehicle toward the stake 18.

After the vehicle has been removed from the rut, the drum may be quickly detached by loosening the clamping fingers 14 which will disengage the radial arms 8 from the spokes of the wheel and the stake 18 may be uprooted by the use of the sledge, the parts being capable of being placed in the tool box of the automobile.

It will be seen that by engaging the clamping fingers 14 with the adjacent forward spokes of the driving wheel, a positive driving of the drum by the driving wheel is provided as the inturned portion 12 of each of the radial arms of the drum is engaged upon its rear side by the adjacent spoke and moved forward by the movement of the wheel.

As the clamping fingers 14 may be swung into engagement with the spoke upon either side of the radial arm, it will be seen that the drum is adjustable for attachment to either driving wheel of the automobile.

I claim:—

1. An attachment for driving wheels of motor vehicles including a cable winding drum, radially extending arms upon the drum, each arm being arranged to engage a spoke, a clamping finger upon each arm for engagement with a spoke of the driving-wheel for clamping the arm against the next adjacent spoke.

2. An attachment for driving wheels of motor vehicles including a cable winding drum, radially extending arms upon the drum, an inturned end upon each arm for engagement with the adjacent spoke of the driving-wheel and a clamping finger upon each arm for engagement with the next adjacent spoke.

CHARLES J. JOHNSON.